United States Patent
Katsura et al.

(10) Patent No.: US 7,746,554 B2
(45) Date of Patent: Jun. 29, 2010

(54) LENTICULAR LENS, LIGHT-DIFFUSING SHEET, AND PROJECTION SCREEN

(75) Inventors: Yuki Katsura, Mihara (JP); Futoshi Osawa, Higashihiroshima (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 220 days.

(21) Appl. No.: 11/916,578

(22) PCT Filed: Jun. 28, 2006

(86) PCT No.: PCT/JP2006/312867

§ 371 (c)(1),
(2), (4) Date: Dec. 5, 2007

(87) PCT Pub. No.: WO2007/001013

PCT Pub. Date: Jan. 4, 2007

(65) Prior Publication Data

US 2009/0225418 A1 Sep. 10, 2009

(30) Foreign Application Priority Data

Jun. 29, 2005 (JP) .............................. 2005-189968

(51) Int. Cl.
*G03B 21/60* (2006.01)

(52) U.S. Cl. ........................................ 359/455; 359/626
(58) Field of Classification Search ......... 359/455–457, 359/460, 619, 626
See application file for complete search history.

(56) References Cited

U.S. PATENT DOCUMENTS

| 6,822,792 | B2 * | 11/2004 | Goto | 359/456 |
| 6,995,907 | B2 * | 2/2006 | Osawa et al. | 359/460 |
| 7,180,664 | B2 * | 2/2007 | Goto | 359/456 |
| 7,453,639 | B2 * | 11/2008 | Katsura | 359/460 |
| 7,474,463 | B2 * | 1/2009 | Katsura et al. | 359/455 |

FOREIGN PATENT DOCUMENTS

| JP | 62-260131 A1 | 11/1987 |
| JP | 09-230507 A1 | 9/1997 |
| JP | 2004-004148 A1 | 1/2004 |
| JP | 2004-294465 A1 | 10/2004 |

\* cited by examiner

*Primary Examiner*—Christopher Mahoney
(74) *Attorney, Agent, or Firm*—Burr & Brown

(57) ABSTRACT

A lenticular lens comprises multiple convex unit lenses, two sides of each unit lens being curved surfaces gradually spreading outwardly from the upside (plane of emergence) to the base (plane of incidence) of the unit lens, and these unit lenses are disposed on a base film in parallel with each other. The acute angle θ between a tangent to two curves corresponding to the two sides of the unit lens on its section vertical to the longer direction and a line parallel to the upside (or the base) of the unit lens is in a range represented by the following inequality:

$$139(d/p)^3 - 176(d/p)^2 + 78(d/p) + 74.4 > \theta > 346(d/p)^3 - 469(d/p)^2 + 219(d/p) + 45.0$$

where d is the length of half of the distance between the two curves, and p is the pitch at which the unit lenses are disposed.

11 Claims, 9 Drawing Sheets

LENTICULAR LENS, LIGHT-DIFFUSING SHEET, AND PROJECTION SCREEN

BACKGROUND OF THE INVENTION

1. Field of the Invention

The present invention relates to a lenticular lens, to a light-diffusing sheet, and to a projection screen.

2. Background Art

In a rear projection display, an image produced by image light emerging (projected) from a light source set at the rear of the display is displayed on a projection screen mounted on the front of the display.

A cross-sectional view of a lenticular lens, a component part of a projection screen, is shown in FIG. 7 in Patent Document 1. The lenticular lens has, on one side, multiple unit lenses 11 in the shape of trapezoidal prisms, and a pair of oblique sides of a trapezoidal cross section of each unit lens 11 are curved.

By making a pair of slanting surfaces (oblique sides on a cross-sectional view) of each one of the multiple unit lenses 11 on one side of the lenticular lens curved, it is possible to improve the uniformity of light emerging from the projection screen.

Patent Document Japanese Laid-Open Patent Publication No. 2004-294465

SUMMARY OF THE INVENTION

An object of the present invention is to provide the specific shape of a pair of slanting surfaces (curved surfaces) of a unit lens with which emerging light that is uniform in luminosity and that is bright when viewed even from an oblique direction (that can be observed without difficulty even from an oblique direction) can be obtained.

Another object of the present invention is to provide a lenticular lens, a light-diffusing sheet, and a projection screen that are useful for obtaining emerging light that is uniform in luminosity and that is bright when viewed even from an oblique direction (that can be observed without difficulty even from an oblique direction).

The present invention is a lenticular lens formed on a base film, comprising multiple convex unit lenses disposed on the base film with their long sides parallel to each other, the two edges of each unit lens on its section vertical to the longer direction being a pair of curves spreading outwardly from the upside of the cross section, situated on the side opposite to the base film, to the base of the cross section, situated on the base film side, the angle $\theta$ between a tangent to the curves of each unit lens and a line parallel to the upside and base of the unit lens being acute, the angle $\theta$ with any line parallel to the upside and base of the unit lens being in a range represented by the following inequality:

$$139(d/p)^3-176(d/p)^2+78(d/p)+74.4 > \theta > 346(d/p)^3-469(d/p)^2+219(d/p)+45.0$$

where d is the length of half of the distance between the two curves, and p is the pitch at which the unit lenses are disposed.

The present invention is the lenticular lens in which the acute angle $\theta$ is in a range represented by the following inequality:

$$-2252.5(d/p)^4+3220.6(d/p)^3-1752.9(d/p)^2+456.61(d/p)+34.546 > \theta > -2252.5(d/p)^4+3400.8(d/p)^3-1951.6(d/p)^2+530.66(d/p)+23.086.$$

The present invention is the lenticular lens in which a space between each two adjacent unit lenses is filled with a resin having a refractive index lower than that of the unit lenses.

The base film is in sheet form, and on this base film are formed the multiple unit lenses. Each unit lens is convex and has a pair of oblique sides (two sides), the upside, and the base. Light (image light) enters the unit lens from the base and emerges from the upside. The upside (plane of emergence) and base (plane of incidence) of the unit lens are nearly parallel to each other, and the two oblique sides of the unit lens connect the two ends of the upside (plane of emergence) of the unit lens and those of the base (plane of incidence) of the unit lens, respectively. The width of the upside (plane of emergence) of the unit lens is narrower than that of the base (plane of incidence) of the unit lens, and the two oblique sides of the unit lens are in the shape of curved surfaces gradually spreading outwardly from the upside to the base. The horizontal position of the upside (plane of emergence) of the unit lens is nearly the center of the base (plane of incidence) of the unit lens.

The section of the unit lens, vertical to the longer direction, is nearly trapezoidal. Since the unit lens gradually spreads outwardly from its upside (plane of emergence) to its base (plane of incidence), the oblique sides of the trapezoidal section, vertical to the longer direction, of the unit lens (corresponding to the two oblique sides of the unit lens) are a pair of nearly symmetrical curves spreading outwardly. In an embodiment, a groove between each two adjacent unit lenses is filled with a resin having a refractive index lower than that of the unit lenses.

In this invention, the shape of a pair of oblique sides (curved surfaces) of the unit lens is specified by the acute angle $\theta$ between a tangent to a pair of curves showing the two oblique sides of the unit lens on its section vertical to the longer direction and a line parallel to the upside and base of the unit lens. The two oblique sides (curves) are curved surfaces (curved lines) gradually spreading outwardly, so that the acute angle with a curve situated near the plane of emergence of the unit lens (the short side of the trapezoidal cross section) never exceeds the acute angle with a curve situated near the plane of incidence of the unit lens (the long side of the trapezoidal cross section).

The range of the acute angle $\theta$ was determined in the light of the following two points.

(1) The acute angle $\theta$ must be in such a range that emerging light providing only one positive half value angle can be obtained.

The half value angle is an angle (angle of observation) at which the relative brightness is 0.5, when the brightness value at the horizontal angle (angle of observation) at which light with maximum luminosity (brightness) emerges (in general, in the center of a screen (angle of observation=0°)) is taken as 1. The angle of observation includes positive angle of observation (right-hand side of a viewer) and negative angle of observation (left-hand side of a viewer). When emerging light provides only one positive half value angle (as well as one negative half value angle), no huge variations occur in luminosity.

(2) The half value angle must be equal to or greater than a predetermined angle.

A greater half value angle makes it possible to view a relatively bright image even when a screen provided with the lenticular lens is observed from an oblique direction.

By making the shape of a pair of oblique sides (curved surfaces) of the unit lens so that the angle $\theta$ falls in the angle range specified in the present invention, there can be obtained emerging light that provides only one half value angle, and the horizontal uniformity of emerging light can thus be improved. Further, even when the light is observed from a relatively oblique direction, a bright image can be viewed.

The present invention also provides a light-diffusing sheet having the following definition.

The present invention is a light-diffusing sheet comprising a lens element sheet containing a base film, a prism lens formed on one surface of the base film and a lenticular lens formed on the other surface of the base film, and a support laminated to the lens element sheet, where parallel light entering the light-diffusing sheet from the prism lens side emerges from the support side, characterized in that the lenticular lens has multiple convex unit lenses disposed on the base film with their long sides parallel to each other, that the two edges of each unit lens on its section vertical to the longer direction are a pair of curves spreading outwardly from the upside of the cross section, situated on the side opposite to the base film, to the base of the cross section, situated on the base film side, and that a space between each two adjacent unit lenses is filled with a resin having a refractive index lower than that of the unit lenses.

The present invention is the light-diffusing sheet in which the lenticular lens has such a structure that light emerging from the support provides only one positive half value angle.

The present invention is the light-diffusing sheet in which the lenticular lens has such a structure that light emerging from the support provides a positive half value angle of 35° or more.

The present invention is the light-diffusing sheet in which the lenticular lens provides only one positive half value angle, and the positive half value angle is 35° or more.

The present invention is the light-diffusing sheet in which the lenticular lens makes light emerge from the support so that the emerging light has such a luminosity distribution that the luminosity decreases almost monotonically as the angle of observation increases.

The present invention is the light-diffusing sheet in which the angle θ between a tangent to the curves of each unit lens and a line parallel to the upside and base of the unit lens is acute, and the angle θ with any line parallel to the upside and base of the unit lens is in a range represented by the following inequality:

$$139(d/p)^3 - 176(d/p)^2 + 78(d/p) + 74.4 > \theta > 346(d/p)^3 - 469(d/p)^2 + 219(d/p) + 45.0$$

where d is the length of half of the distance between the two curves, and p is the pitch at which the unit lenses are disposed.

The present invention is the light-diffusing sheet in which the acute angle θ is in a range represented by the following inequality:

$$-2252.5(d/p)^4 + 3220.6(d/p)^3 - 1752.9(d/p)^2 + 456.61(d/p) + 34.546 > \theta > -2252.5(d/p)^4 + 3400.8(d/p)^3 - 1951.6(d/p)^2 + 530.66(d/p) + 23.086.$$

Between the lens element sheet and the support may be present other member (e.g., an adhesive resin, etc.).

By designing the lenticular lens (unit lenses) so that the acute angle θ falls in the above-described angle range, there can be obtained emerging light having such a luminosity distribution (gain curve) that the luminosity decreases almost monotonically as the angle of observation increases (the absolute value of the angle of observation when a distinction is made between the angle of observation on the left-hand side and that on the right-hand side by putting "positive (plus)" and "negative (minus)" to the angles of observation, respectively) (emerging light that gradually gets darker as the angle of observation gradually increases).

The present invention is a projection screen comprising a Fresnel lens and a lenticular lens, the lenticular lens being formed on a base film and comprising multiple convex unit lenses disposed on the base film with their long sides parallel to each other, the two edges of each unit lens on its section vertical to the longer direction being a pair of curves spreading outwardly from the upside of the cross section, situated on the side opposite to the base film, to the base of the cross section, situated on the base film side, the angle θ between a tangent to the curves of each unit lens and a line parallel to the upside and base of the unit lens being acute, the angle θ with any line parallel to the upside and base of the unit lens being in a range represented by the following inequality:

$$139(d/p)^3 - 176(d/p)^2 + 78(d/p) + 74.4 > \theta > 346(d/p)^3 - 469(d/p)^2 + 219(d/p) + 45.0$$

where d is the length of half of the distance between the two curves, and p is the pitch at which the unit lenses are disposed.

The present invention is a projection screen comprising a Fresnel lens and a light-diffusing sheet, the light-diffusing sheet comprising a lens element sheet containing a base film, a prism lens formed on one surface of the base film and a lenticular lens formed on the other surface of the base film, and a support laminated to the lens element sheet, where parallel light entering the light-diffusing sheet from the prism lens side emerges from the support side, characterized in that the lenticular lens has multiple convex unit lenses disposed on the base film with their long sides parallel to each other, that the two edges of each unit lens on its section vertical to the longer direction are a pair of curves spreading outwardly from the upside of the cross section, situated on the side opposite to the base film, to the base of the cross section, situated on the base film side, and that a space between each two adjacent unit lenses is filled with a resin having a refractive index lower than that of the unit lenses.

The present invention is the projection screen in which the angle θ between a tangent to the curves of each unit lens and a line parallel to the upside and base of the unit lens is acute, and the angle θ with any line parallel to the upside and base of the unit lens is in a range represented by the following inequality:

$$139(d/p)^3 - 176(d/p)^2 + 78(d/p) + 74.4 > \theta > 346(d/p)^3 - 469(d/p)^2 + 219(d/p) + 45.0$$

where d is the length of half of the distance between the two curves, and p is the pitch at which the unit lenses are disposed.

DETAILED DESCRIPTION OF THE INVENTION

Figure 1:
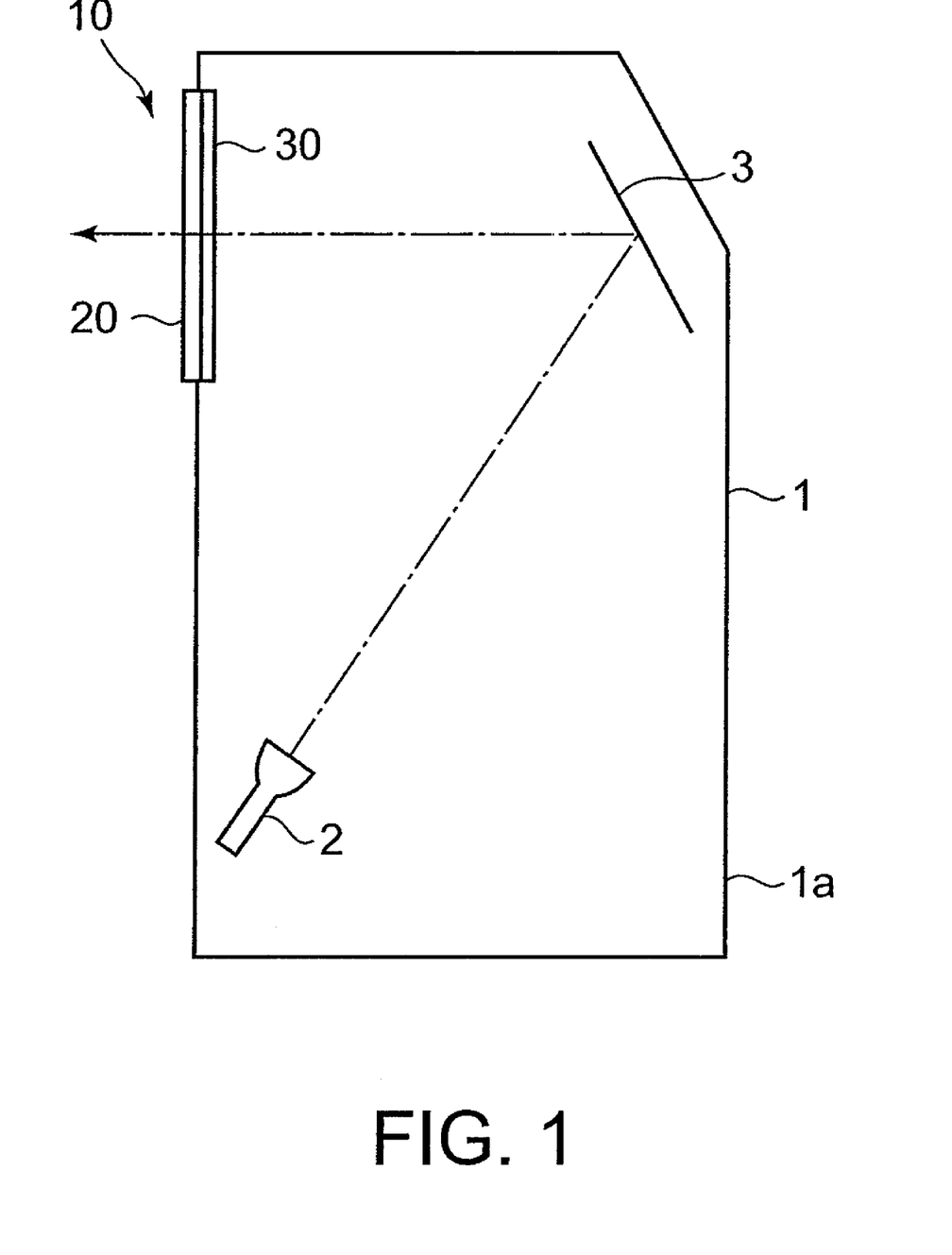
FIG. 1 is a diagrammatical view showing the internal structure of a projection display.

FIG. 1 is a view diagrammatically showing the internal structure of a rear projection display 1.

The rear projection display 1 is that image light emerging (projected) from a projector (light source) 2 is projected on a projection screen 10 mounted on the front of the projection display 1 to display, on the surface of the projection screen 10, an image (still or moving image) produced by the image light. The projection screen 10 is composed of a light-diffusing sheet 20 and a Fresnel lens 30 placed over it. The image light projected from the projector 2 is reflected from a mirror 3 placed inside the projection display 1 and emerges from the projection display 1 to the outside via the Fresnel lens 30 and the light-diffusing sheet 20 (an image is displayed on the light-diffusing sheet 20). The surface of the projection screen 10 (as well as the surface of the Fresnel lens 30 and that of the light-diffusing sheet 20) on which image light projected from the projector 2 is incident is hereinafter referred to as a "plane of incidence". The surface of the projection screen 10 (as well as the surface of the Fresnel lens 30 and that of the light-diffusing sheet 20) from which the image light that has entered the plane of incidence emerges is hereinafter referred to as a "plane of emergence".

The projection screen 10 is set on the frame 1a of the projection display 1, and, as mentioned above, constitutes a screen of the projection display 1. The projection screen 10 comes under the category of transmission screens because image light that has entered the projection screen 10 from its plane of incidence emerges from its plane of emergence.

Figure 2:
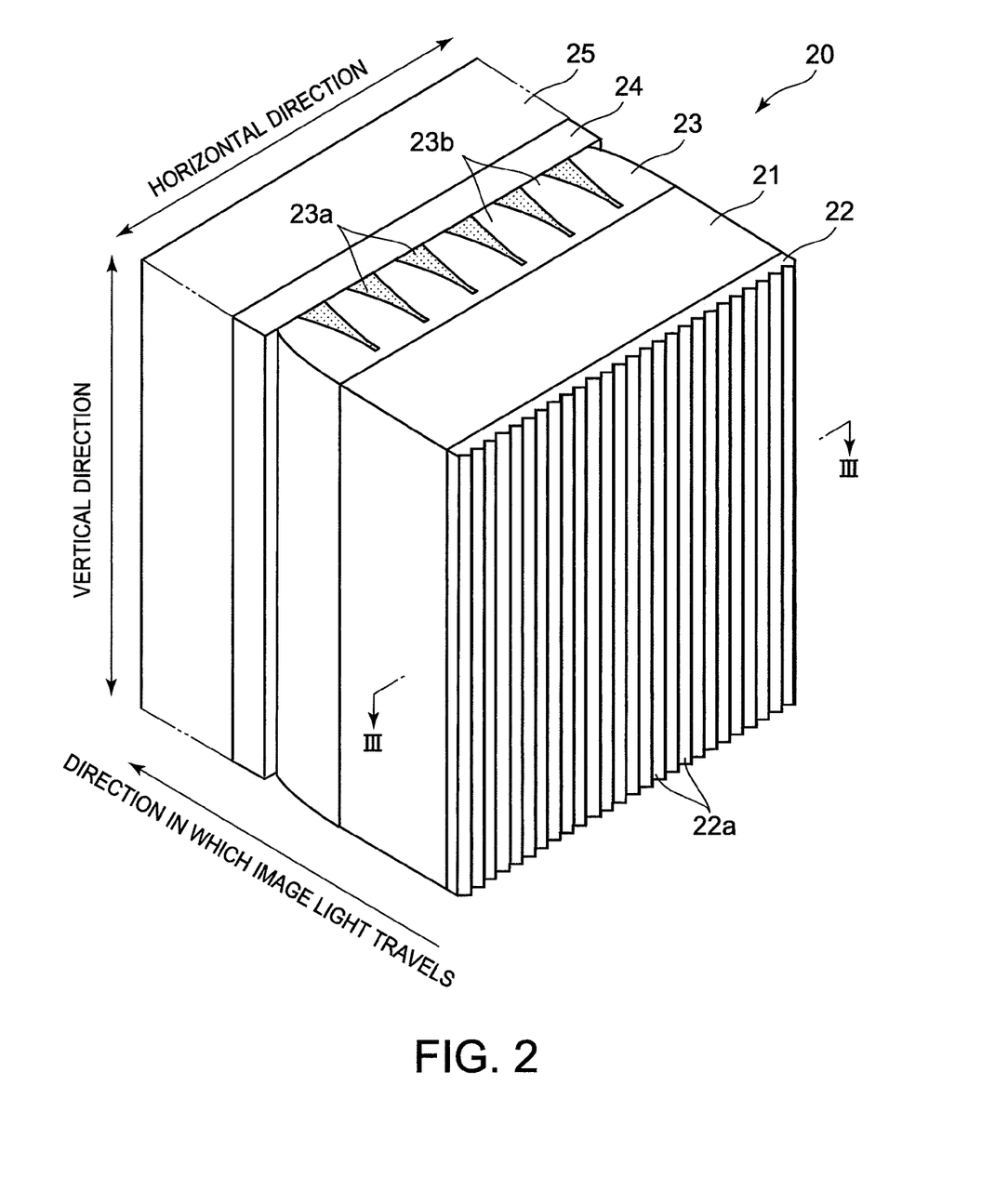
FIG. 2 is a perspective view of a light-diffusing sheet.
Figure 3:
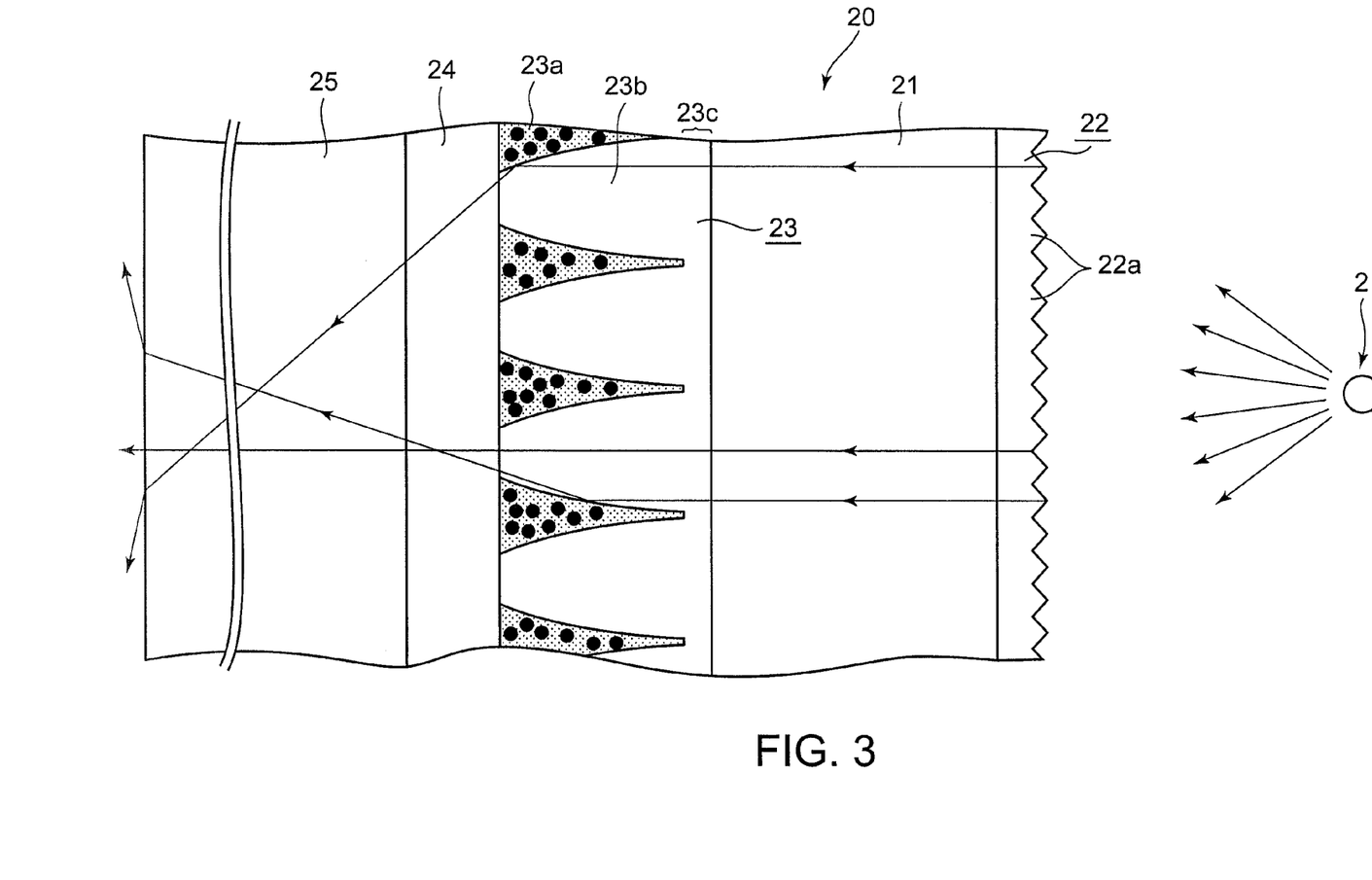
FIG. 3 is a sectional view taken along line III-III of FIG. 2.

FIG. 2 is a perspective view of the light-diffusing sheet 20 constituting the projection screen 10, and FIG. 3 shows a sectional view taken along line III-III of FIG. 2, together with the projector 2 (light source). In FIG. 2, the light-diffusing sheet 20 is depicted with its horizontal length (breadth) and vertical length (height) shortened, for convenience' sake.

The light-diffusing sheet 20 comprises a base film 21, a prism lens 22 formed on the plane of incidence of the base film 21, and a lenticular lens 23 formed on the plane of emergence of the base film 21. A support 25 useful in fixing the light-diffusing sheet 20 (projection screen 10) to the projection display 1 is provided on the plane of emergence of the lenticular lens 23 with an UV adhesive resin 24 between them.

The image light emerging from the projector 2 is reflected from the mirror 3 and enters the Fresnel lens 30 (see FIG. 1). The Fresnel lens 30 controls the direction of the image light incident on it so that the light travels in the direction of the normal to the plane of incidence (plane of emergence) of the projection screen 10 (light travelling in the direction of the normal to the plane of incidence (plane of emergence) of the projection screen 10 is usually referred to as parallel light). The parallel image light enters the prism lens 22 in the light-diffusing sheet 20.

Multiple projecting (trigonal prismatic) unit lenses 22a whose longer direction corresponds to the vertical direction of the projection screen 10 are disposed side by side on the plane-of-incidence side of the prism lens 22. The prism lens 22 horizontally splits the parallel light emerging from the Fresnel lens 30 (the representation of splitting of the light by the prism lens 22 is omitted from FIG. 3).

The image light that has emerged from the prism lens 22 passes through the base film 21 and enters the lenticular lens 23.

The lenticular lens 23 is useful for diffusing the incident image light mainly in the transverse direction of the projection screen 10 (towards both the left- and right-hand sides of a viewer looking at the plane of emergence of the projection screen 10). On the plane-of-emergence-side of the lenticular lens 23, there are V-shaped grooves 23 whose longer direction corresponds to the vertical direction of the projection screen 10 (the direction of the height of the projection screen 10, or the vertical direction for a viewer looking at the plane of emergence). Microscopically, the bottom of the V-shaped groove 23a is flat and is positioned slightly above the base of the lenticular lens 23 (the depth of the V-shaped groove 23a is less than the height of the lenticular lens 23). The lenticular lens 23 has, on the plane of emergence of the base sheet 21, multiple convex unit lenses 23b whose longer direction corresponds to the vertical direction of the projection screen 10, and the unit lenses 23b are disposed in parallel with each other on the base sheet 21 with a substrate (covering, joining part) 23c between the unit lenses 23b and the base sheet 21. The section of the unit lens 23b (see FIG. 3), vertical to the longer direction, is nearly trapezoidal. Image light enters the base (long side) 23e, situated on the side of the base film 21, of the trapezoidal cross section of the unit lens 23b, and emerges from the upside (short side) 23f, situated on the side opposite to the base film 21, of the trapezoidal cross section.

The V-shaped grooves 23a are filled with a low-refractive-index member to which light-absorbing particles (indicated by black dots in FIG. 3) are added. The low-refractive-index member has a refractive index lower than that of the lenticular lens 23. The low-refractive-index member to which light-absorbing particles are added is usually black in color, and when the lenticular lens 23 in which the V-shaped grooves 23a are filled with the low-refractive-index member is viewed from the front, it looks as if it had a large number of black lines on its surface. The V-shaped grooves 23a filled with the low-refractive-index member are therefore called black stripes (BS's). The V-shaped grooves 23a filled with the low-refractive-index member are hereinafter referred to as BS's 23a.

Almost all image light incident on the boundaries between the unit lenses 23b and the BS's 23a is reflected (total reflection). The image light entering the BS's 23a without being reflected is absorbed by the light-absorbing particles added to the low-refractive-index member.

Figure 5:
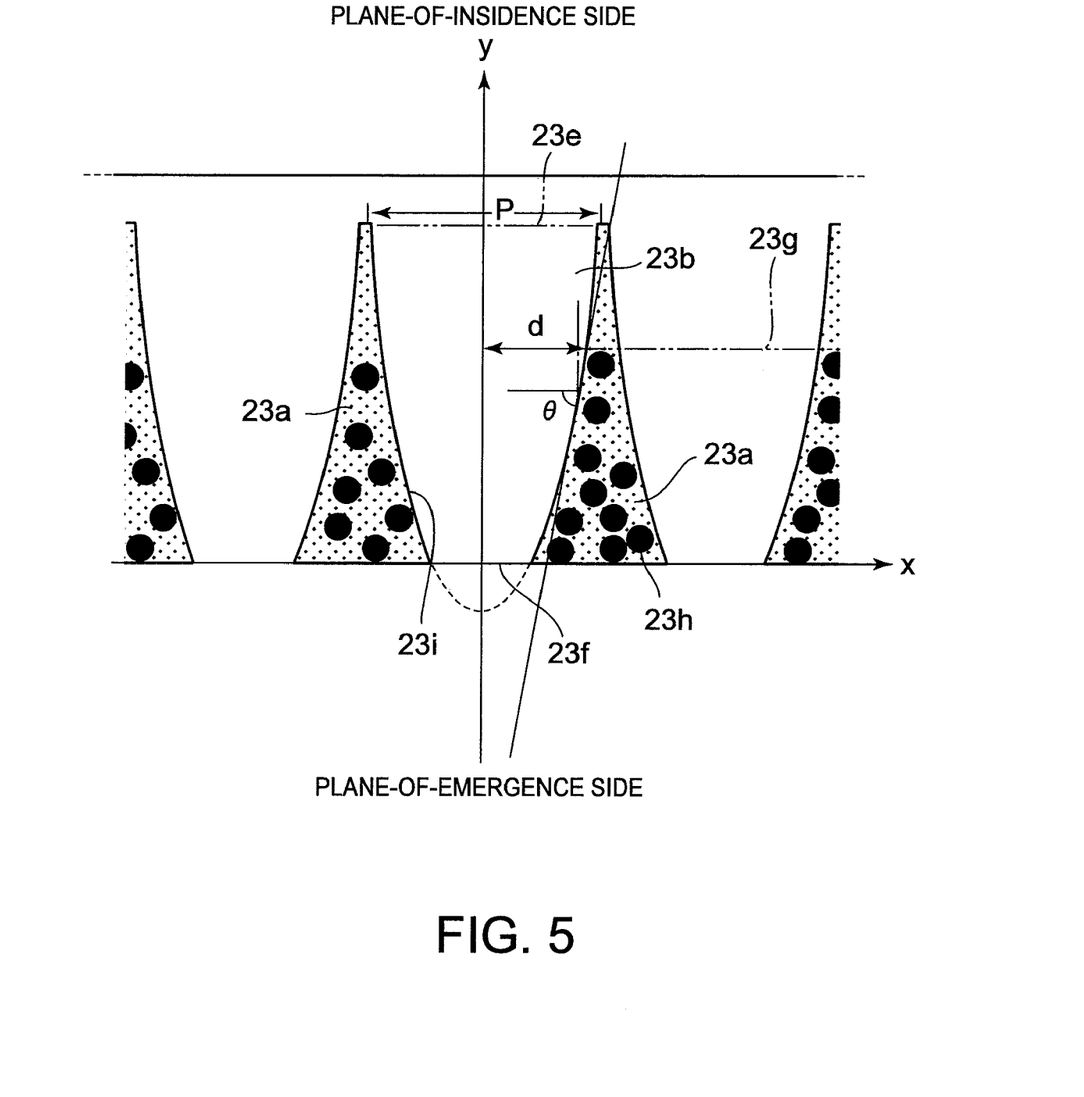
FIG. 5 is a view showing the relationship between the x and y coordinates and the curves on a cross section of unit lenses.

The two oblique sides of the unit lens 23b consist of a pair of curved surfaces (on the cross section of the unit lens 23, a pair of curved lines) spreading outwardly (in FIGS. 2 and 3, as well as in FIG. 5 that will be described later, the curved surfaces (curved lines) are exaggerated for easy understanding). The curved surfaces (curved lines) are in the shape that fulfills predetermined requirements (which will be clarified in the descriptions below).

The image light horizontally diffused by the lenticular lens 23 passes through the UV adhesive resin 24 and the support 25, and emerges from the light-diffusing sheet 20 to the outside.

The shape of the two sides (two slanting surfaces) of the unit lens 23b will now be described.

Figure 4:
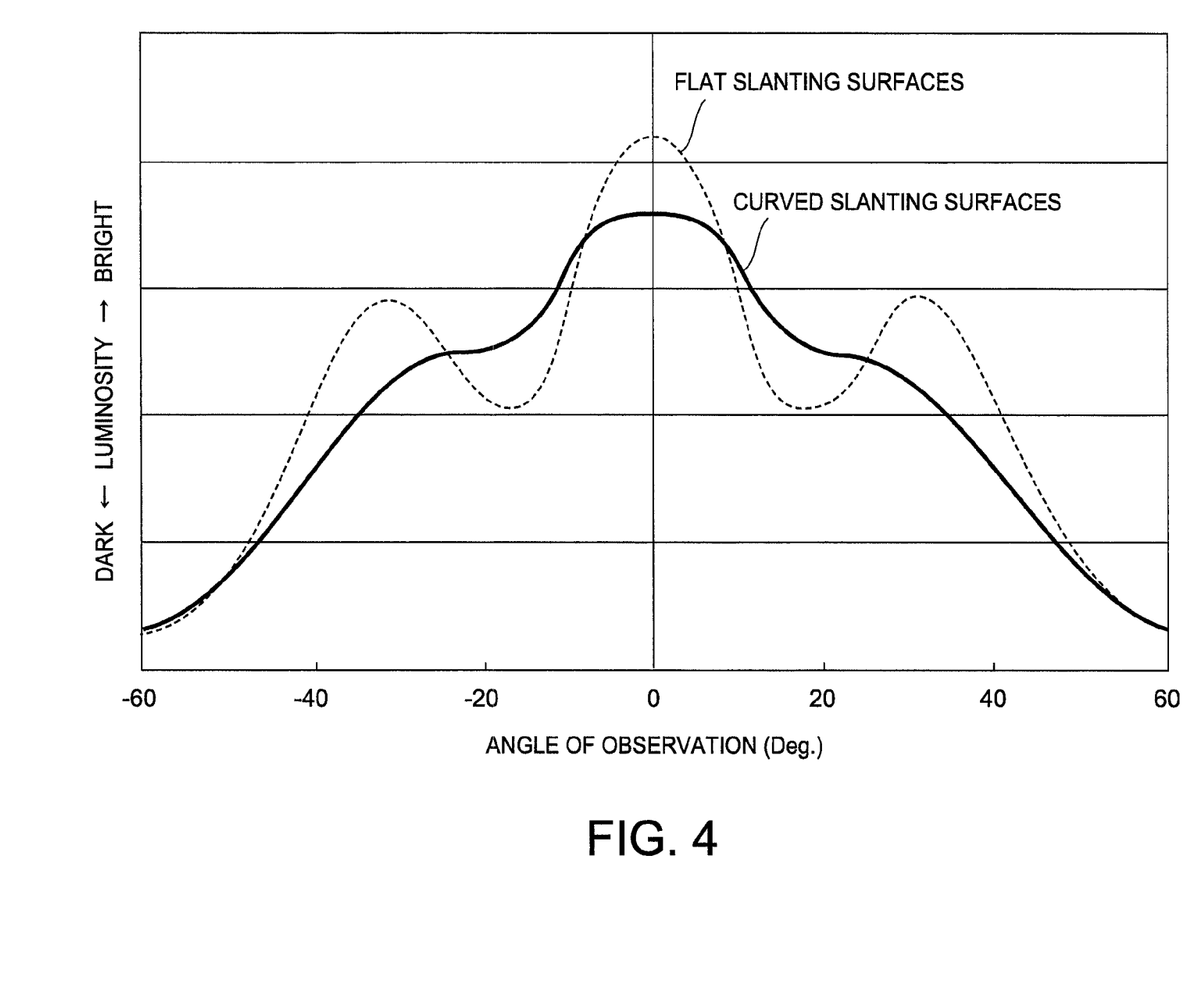
FIG. 4 is a diagram showing the relationship between the horizontal angle (angle of observation) and the luminosity of light emerging from a projection screen having unit lenses, two sides of each unit lens being flat or curved slanting surfaces.

By making the two sides (two slanting surfaces) of the unit lens 23b curved, the uniformity of the horizontal luminosity (brightness) of light emerging from the plane of emergence of the projection screen 10 can be made higher, as compared with the case where the two surfaces of the unit lens 23b are made flat. FIG. 4 shows the relationship (gain curve) between the horizontal angle (angle of observation) and the luminosity of light emerging from the projection screen 10. In FIG. 4, the dotted line shows the case where the two sides of slanting surfaces of the unit lens 23b are flat, while the thick, solid line shows the case where the two sides of slanting surfaces of the unit lens 23b are curved.

As shown in FIG. 4, when the slanting surfaces of the unit lens 23b are made curved, the horizontal luminosity of light emerging from the projection screen 10 becomes more uniform (luminosity distribution becomes smooth) as compared with the case where the slanting surfaces of the unit lens 23b are made flat. Variations of luminosity with the position of observation are reduced, so that the projection screen 10 can display a clear image.

In the technical field of projection screens, the half value angle is used as a measure of variations of luminosity with the position of observation. The half value angle is an angle (angle of observation) at which the relative brightness is 0.5, when the brightness at the horizontal angle (angle of observation) at which light with maximum luminosity (brightness) emerges (in general, in the center of a screen (angle of observation=0°)) is taken as 1.

If only positive angles (angles of observation of 0° or more in FIG. 4) are considered, it can be said that variations of luminosity with the position of observation are great when two or more positive half value angles exist. It is therefore preferred that only one positive half value angle be present at positive angles.

Further, when the half value angle is greater, a relatively bright image can be viewed even when the projection screen is observed from an oblique direction. The greater the positive half value angle, the more advantageous.

The applicant tried to determine, by carrying out simulations, the shape of the two sides of slanting surfaces of the unit lens 23b with which emerging light fulfilling the requirements that emerging light provides only one positive half value angle (not two or more) and that the positive half value angle is 35° or more (these two requirements being collectively referred to as the "requirement for optimization") can be obtained.

The shape of a pair of curves 23i showing the two oblique sides of the unit lens 23b on its section vertical to the longer direction of the unit lens 23b can be specified by a functional equation on two dimensional (x-y) coordinates. In simulation for determining the shape of the curves, the shape of the curves is specified by a functional equation; the brightness of light emerging from a lenticular lens 23 composed of unit lenses 23b, designed so that each unit lens 23b has, on its cross section, curves fulfilling the functional equation, is determined by changing the angle of observation; and the shape of the curves (functional equation) is corrected so that it meets the above-described requirement for optimization.

In the correction of the shape of the curves, the angle (hereinafter referred to as the taper angle θ) of a pair of curves 23i (hereinafter referred to simply as curves of the unit lens 23) (the acute angle between a tangent to the curves of the unit lens 23b and a line parallel to the plane of incidence (the base) (or the plane of emergence (the upside)) of the unit lens 23b) showing the two oblique sides of the unit lens 23b on its section vertical to the longer direction is used as a variable. This is because it is possible to control the luminosity (brightness) at the desired angle of observation by adjusting the taper angle θ. In the simulation, the shape of the curves (functional equation) initially set is subjected to recalculation so that the unit lens 23b has the taper angle θ adjusted. It is needless to say that the taper angle θ varies depending upon the point on the curves of the unit lens 23b, at which the taper angle θ is determined. Further, as will be described later, the taper angle θ is specified by the width of the plane of incidence of the unit lens 23b (the length of the base (long side) of the trapezoidal cross section) (hereinafter referred to as a pitch p at which the unit lenses are disposed) and the length d of half of the distance between the above-described pair of curves 23i (hereinafter also referred to as a "distance").

Linear functions are excluded from functional equations to be initially set to express the curves 23i of the unit lens 23b. This is because the shape of a curve cannot be specified by a linear function. Further, a functional equation containing a term with an odd exponent ($x$, $x^3$, $x^5$, etc.) cannot express a curve that shows the opposing oblique sides of the unit lens 23b. For this reason, a quadratic or higher function (polynomial function) containing terms with even exponents only is used as a functional equation for specifying the initial shape (before correction) of the curves of the unit lens 23b. Drawn by such a functional equation initially set is a parabola (a curve gradually spreading outwardly) with its apex on the y-axis.

Explanation of the simulation results will be given below. In this example, the following five functional equations (equations specifying the shape of the curves of the above-described unit lens 23b) will be representatively described.

$y = 2 \cdot 10^{-8} x^6 - 9 \cdot 10^{-5} x^4 + 0.4172 x^2 - 37.709$    Functional equation (1)

$y = -5 \cdot 10^{-5} x^4 + 0.2860 x^2 - 23.745$    Functional equation (2)

$y = 6 \cdot 10^{-5} x^4 + 0.1583 x^2 - 14.325$    Functional equation (3)

$y = -2 \cdot 10^{-5} x^4 + 0.1619 x^2 - 13.993$    Functional equation (4)

$y = -2 \cdot 10^{-5} x^4 + 0.1286 x^2 - 10.828$    Functional equation (5)

Figure 6:
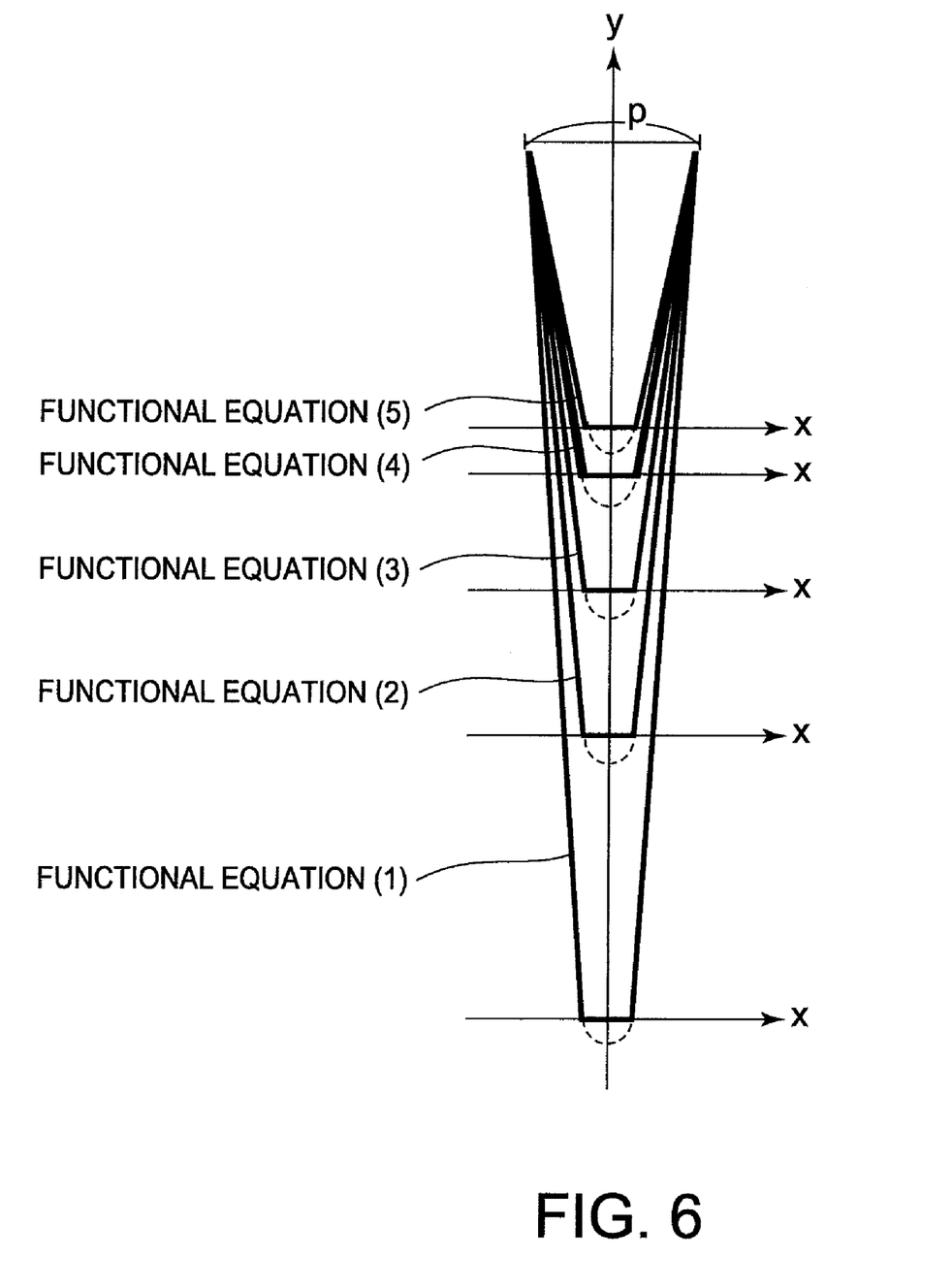
FIG. 6 is a view showing on the x and y coordinates the cross-sectional shapes of unit lenses expressed by five functional equations.

FIG. 6 shows the functional equations (1) to (5) on the x and y coordinates. In FIG. 6, the trapezoidal sections of unit lenses 23b are shown with the bases (long sides) of the trapezoids trued up. Therefore, the position of the x-axis (the position of the upside (short side) of the trapezoidal cross section of the unit lens 23b) varies depending upon the functional equation. Further, in the simulation, the width of the plane of incidence of the unit lens 23b (the length of the base (long side) of the trapezoidal section) (pitch p) is set to 1 mm, and the width of the plane of emergence of the unit lens 23b (the length of the upside (short side) of the trapezoidal section) is set to 0.3 mm. With the above-described flat bottom of the V-shaped groove taken into consideration, the sum total of the width of the plane of incidence of the unit lens 23b and the width of the flat bottom of the V-shaped groove may also be taken as the pitch p. The width of the plane of incidence of the unit lens 23b (pitch p) and the width of the plane of emergence of the unit lens 23b may, of course, be freely adjusted (according to the results of measurement, etc.).

Figure 7:
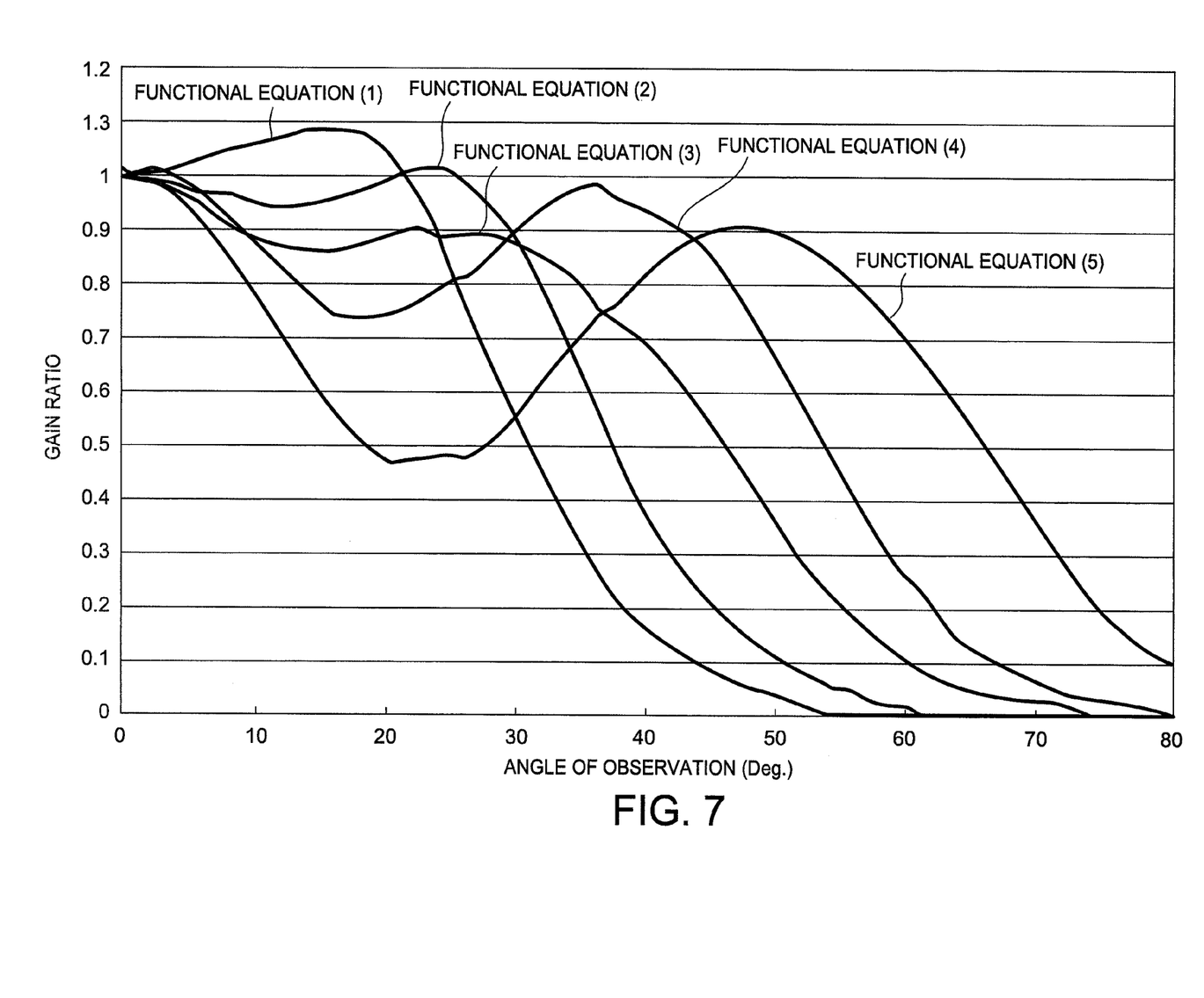
FIG. 7 is a diagram showing the relationship between the horizontal angle (angle of observation) and the luminosity of light emerging from a projection screen comprising a lenticular lens composed of unit lenses, each unit lens being in the shape expressed by one of five functional equations.

FIG. 7 shows the results of the simulation, that is, the relationship between the horizontal angle of observation (positive angles only) and the luminosity of light emerging from a projection screen 10 containing a lenticular lens 23 with unit lenses 23b, the curves of each unit lens 23b being in the shape specified by one of the above-described five functional equations. Shown in FIG. 7 are graphs of luminosity plotted against positive angles of observation. Graphs of luminosity plotted against negative angles of observation are symmetrical to the graphs shown in FIG. 7.

When a lenticular lens 23 composed of unit lenses 23b specified by the above-described functional equation (1) was used, the half value angle was less than 35°, and the aforementioned requirement for optimization was not fulfilled. When a lenticular lens 23 composed of unit lenses 23b specified by the functional equation (5) was used, more than two half value angles were present, so that the requirement for optimization was not fulfilled.

On the other hand, when a lenticular lens 23 composed of unit lenses 23b specified by the functional equation (2), (3), or (4) was used, the requirement for optimization was fulfilled.

Figure 8:
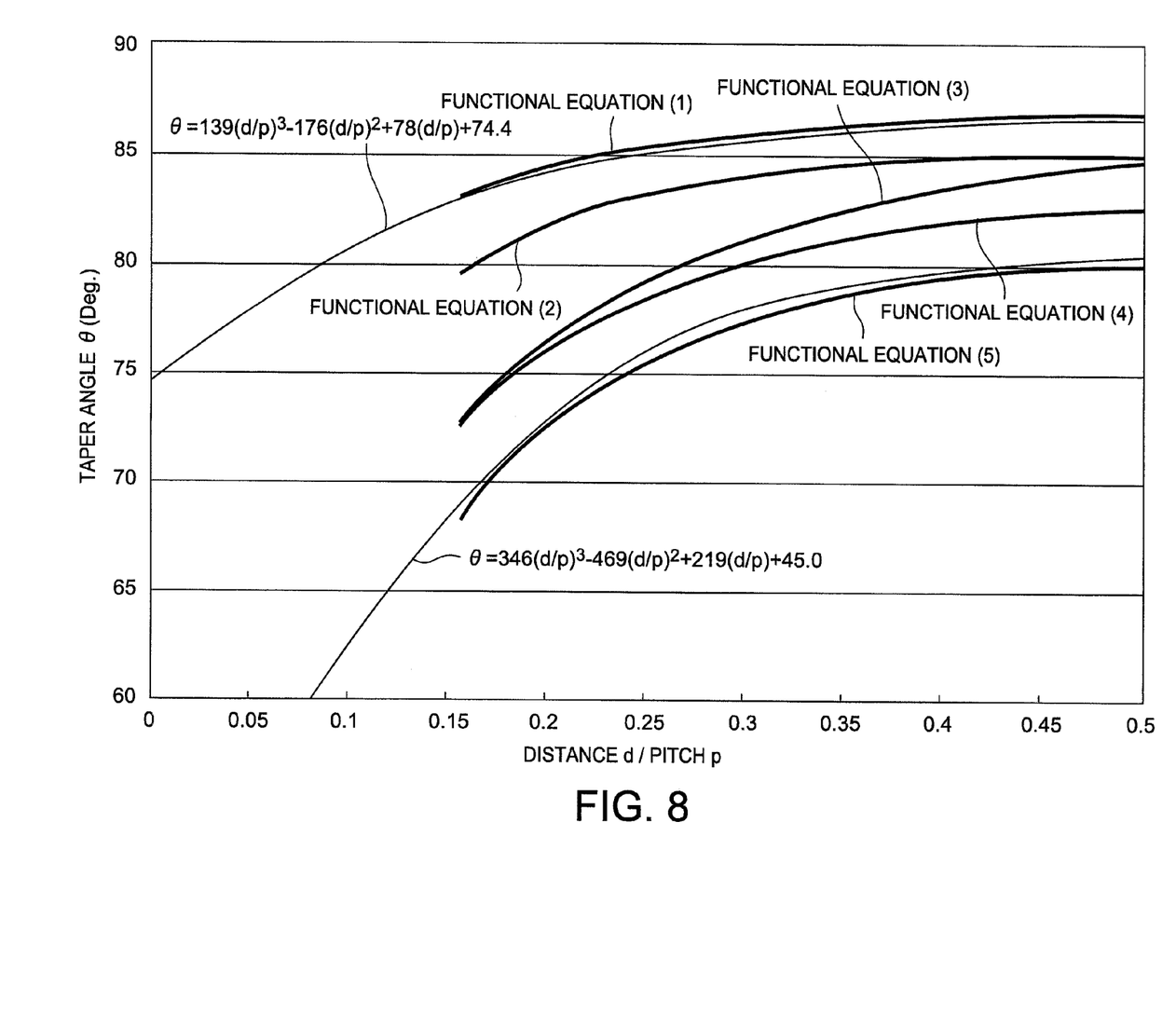
FIG. 8 is a diagram showing the relationship between the value obtained by dividing, by the pitch p, the length d of half of the distance between the two curves of a unit lens in the shape expressed by one of five functional equations and the taper angle θ.

FIG. 8 shows graphs (thick lines) showing the relationship between the value (abscissa axis) obtained by dividing, by the pitch p, the length d of half of the distance between a pair of curves 23i, i.e., between the two intersections of curves 23i and a line 23g parallel to the upside 23f and base 23e of the unit lens 23b (in FIGS. 5 and 6, the distance from the y-axis) and the above-described taper angle θ (ordinate axis) (unit: Deg.). As mentioned above, in this simulation, the pitch p is set to 1 mm, and the width of the plane of emergence of the unit lens 23b (the length of the upside (short side) of the trapezoidal cross section) is set to 0.3 mm, so that the taper angle θ is plotted against d/p ratio ranging from 0.15 to 0.5.

A lenticular lens 23 composed of unit lenses 23b specified by the functional equation (1) or (5) does not fulfill the requirement for optimization, as described above. However, in the graph showing the relationship between the "distance d/pitch p" ratio and the taper angle θ (FIG. 8), the curves below the curve of the functional equation (1) practically fulfills the above-described requirement for optimization, and the curves above the curve of the functional equation (5) practically fulfills the requirement for optimization.

In the graph showing the relationship between the "distance d/pitch p" ratio and the taper angle θ (FIG. 8), the curve (approximate curve) drawn when the unit lens 23b is in the shape specified by the functional equation (1) is expressed by the following equation.

Taper angle $\theta = 139(d/p)^3 - 176(d/p)^2 + 78(d/p) + 74.4$

In the graph showing the relationship between the "distance d/pitch p" ratio and the taper angle θ (FIG. 8), the curve (approximate curve) drawn when the unit lens 23b is in the shape specified by the functional equation (5) is expressed by the following equation.

Taper angle $\theta = 346(d/p)^3 - 469(d/p)^2 + 219(d/p) + 45.0$

Namely, as long as the curves of the unit lens 23b have, with any line 23g parallel to the upside 23f and base 23e of the unit lens 23b, a taper angle θ that fulfills the following inequality, it can be said that the curves practically meet the above-described requirement for optimization.

$139(d/p)^3 - 176(d/p)^2 + 78(d/p) + 74.4 >$ taper angle $\theta > 346(d/p)^3 - 469(d/p)^2 + 219(d/p) + 45.0$ Thus, the shape of a pair of curves 23i of the unit lens 23b (the shape of two oblique sides of the unit lens 23b) that fulfills the requirement for optimization can be specified in terms of taper angle θ. Since the two slanting surfaces of the unit lens 23b are curved surfaces gradually spreading outwardly, the acute taper angle with a curve situated near the plane of emergence of the unit lens 23b never exceeds the angle with a curve situated near the plane of incidence.

In the above-described example, the shape of the two sides of slanting surfaces of the unit lens 23b, with which emerging light fulfilling the requirement for optimization that emerging light provides only one positive half value angle (not two or more half value angles) and that the positive half value angle is 35° or more can be obtained, is specified by the taper angle θ range. The taper angle θ range may further be defined so that emerging light has such a luminosity distribution that the luminosity decreases almost monotonically as the angle of observation (the absolute value of the angle of observation) increases (see the graph (thick line) showing the case where the "slanting surfaces are curved surfaces" in FIG. 4). As a result of the simulation, it was found that the slanting surfaces (curved surfaces) of the unit lens 23b, with which there can be obtained imaging light having such a luminosity distribution that the luminosity decreases almost monotonically as the angle of observation increases, were in such a shape that the taper angle θ is in a range represented by the following inequality.

$-2252.5(d/p)^4 + 3220.6(d/p)^3 - 1752.9(d/p)^2 + 456.61(d/p) + 34.546 >$ taper angle $\theta > -2252.5(d/p)^4 + 3400.8(d/p)^3 - 1951.6(d/p)^2 + 530.66(d/p) + 23.086$.

Figure 9:
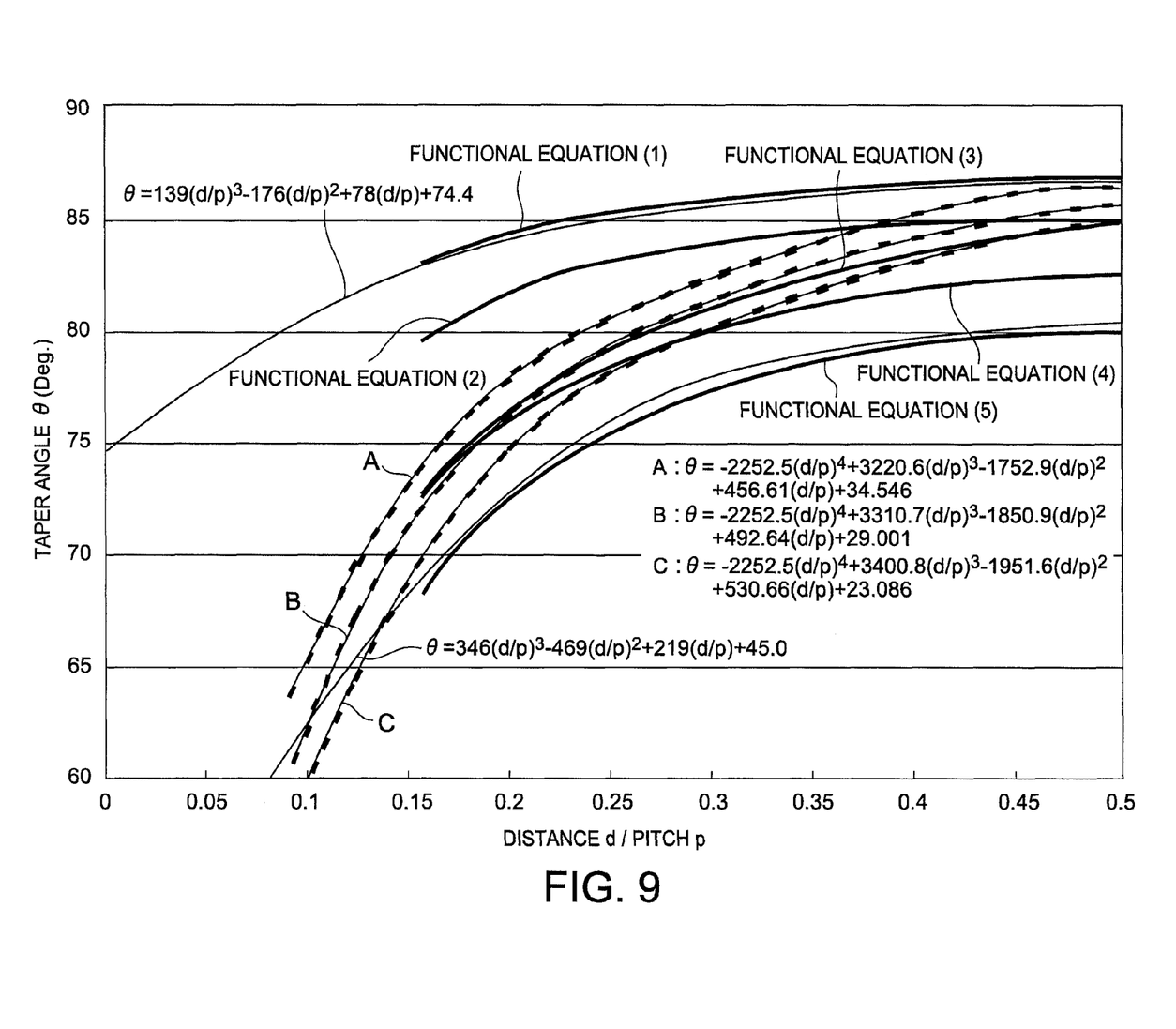
FIG. 9 is a graph showing the upper and lower limits of the taper angle θ specifying the shape of the two sides of slanting surfaces of a unit lens so that emerging light has such a luminosity distribution that the luminosity decreases almost monotonically as the angle of observation increases.

FIG. 9 is a graph showing the relationship between the "distance d/pitch p" ratio and the taper angle θ. In this figure, the curves of the functional equations (1) to (5) are shown together with the curves indicating the upper and lower limits of the taper angle θ specifying the shape of the slanting surfaces (curved surfaces) of the unit lens 23b with which there can be obtained emerging light having such a luminosity distribution that the luminosity decreases nearly monotonically as the angle of observation increases. In FIG. 9, the graph denoted by symbol A (taper angle $\theta = -2252.5(d/p)^4 + 3220.6(d/p)^3 - 1752.9(d/p)^2 + 456.61(d/p) + 34.546$) shows the upper limit of the taper angle θ, and the graph denoted by symbol C (taper angle $\theta = -2252.5(d/p)^4 + 3400.8(d/p)^3 - 1951.6(d/p)^2 + 530.66(d/p) + 23.086$), the lower limit of the taper angle θ. The graph denoted by symbol B (taper angle $\theta = -2252.5(d/p)^4 + 3310.7(d/p)^3 - 1850.9(d/p)^2 + 492.64(d/p) + 29.001$) lies between the graph denoted by symbol A and that denoted by symbol C. In order to obtain emerging light having such a luminosity distribution that the luminosity decreases almost monotonically as the angle of observation increases, it is preferable to from the unit lenses 23b so that they have the taper angle θ denoted by symbol B.

The invention claimed is:

1. A lenticular lens formed on a base film, comprising: multiple convex unit lenses disposed on the base film with their long sides parallel to each other,
the two edges of each unit lens on its section vertical to the longer direction being a pair of curves spreading outwardly from the upside of the cross section, situated on the side opposite to the base film, to the base of the cross section, situated on the base film side,
the angle θ between a tangent to the curves of each unit lens and a line parallel to the upside and base of the unit lens being acute,
the angle θ with any line parallel to the upside and base of the unit lens being in a range represented by the following inequality:

$139(d/p)^3 - 176(d/p)^2 + 78(d/p) + 74.4 > \theta > 346(d/p)^3 - 469(d/p)^2 + 219(d/p) + 45.0$ where d is the length of half of the distance between the two curves, and p is the pitch at which the unit lenses are disposed.

2. The lenticular lens according to claim 1, wherein the acute angle θ is in a range represented by the following inequality:

$-2252.5(d/p)^4 + 3220.6(d/p)^3 - 1752.9(d/p)^2 + 456.61(d/p) + 34.546 > \theta > -2252.5(d/p)^4 + 3400.8(d/p)^3 - 1951.6(d/p)^2 + 530.66(d/p) + 23.086$.

3. The lenticular lens according to claim 1, wherein a space between each two adjacent unit lenses is filled with a resin having a refractive index lower than that of the unit lenses.

4. A light-diffusing sheet comprising:
   a lens element sheet containing a base film, a prism lens formed on one surface of the base film, and a lenticular lens formed on the other surface of the base film, and
   a support laminated to the lens element sheet,
   where parallel light entering the light-diffusing sheet from the prism lens side emerges from the support side, characterized in
   that the lenticular lens has multiple convex unit lenses disposed on the base film with their long sides parallel to each other,
   that the two edges of each unit lens on its section vertical to the longer direction are a pair of curves spreading outwardly from the upside of the cross section, situated on the side opposite to the base film, to the base of the cross section, situated on the base film side, and
   that a space between each two adjacent unit lenses is filled with a resin having a refractive index lower than that of the unit lenses, and
   wherein the angle $\theta$ between a tangent to the curves of each unit lens and a line parallel to the upside and base of the unit lens is acute, and the angle $\theta$ with any line parallel to the upside and base of the unit lens is in a range represented by the following inequality:

$$139(d/p)^3 - 176(d/p)^2 + 78(d/p) + 74.4 > \theta > 346(d/p)^3 - 469(d/p)^2 + 219(d/p) + 45.0$$

where d is the length of half of the distance between the two curves, and p is the pitch at which the unit lenses are disposed.

5. The light-diffusing sheet according to claim 4, wherein the lenticular lens has such a structure that light emerging from the support provides only one positive half value angle.

6. The light-diffusing sheet according to claim 4, wherein the lenticular lens has such a structure that light emerging from the support provides a positive half value angle of 35° or more.

7. The light-diffusing sheet according to claim 4, wherein the lenticular lens provides only one positive half value angle, and the positive half value angle is 35° or more.

8. The light-diffusing sheet according to claim 4, wherein the lenticular lens makes light emerge from the support so that the emerging light has such a luminosity distribution that the luminosity decreases almost monotonically as the angle of observation increases.

9. The light-diffusing sheet according to claim 4, wherein the acute angle $\theta$ is in a range represented by the following inequality:

$$-2252.5(d/p)^4 + 3220.6(d/p)^3 - 1752.9(d/p)^2 + 456.61(d/p) + 34.546 > \theta > -2252.5(d/p)^4 + 3400.8(d/p)^3 - 1951.6(d/p)^2 + 530.66(d/p) + 23.086.$$

10. A projection screen comprising:
    a Fresnel lens, and
    a lenticular lens,
    the lenticular lens being formed on a base film and comprising multiple convex unit lenses disposed on the base film with their long sides parallel to each other,
    the two edges of each unit lens on its section vertical to the longer direction being a pair of curves spreading outwardly from the upside of the cross section, situated on the side opposite to the base film, to the base of the cross section, situated on the base film side,
    the angle $\theta$ between a tangent to the curves of each unit lens and a line parallel to the upside and base of the unit lens being acute,
    the angle $\theta$ with any line parallel to the upside and base of the unit lens being in a range represented by the following inequality:

$$139(d/p)^3 - 176(d/p)^2 + 78(d/p) + 74.4 > \theta > 346(d/p)^3 - 469(d/p)^2 + 219(d/p) + 45.0$$

where d is the length of half of the distance between the two curves, and p is the pitch at which the unit lenses are disposed.

11. A projection screen comprising:
    a Fresnel lens, and
    a light-diffusing sheet,
    the light-diffusing sheet comprising:
    a lens element sheet containing a base film, a prism lens formed on one surface of the base film, and a lenticular lens formed on the other surface of the base film, and
    a support laminated to the lens element sheet,
    where parallel light entering the light-diffusing sheet from the prism lens side emerges from the support side, characterized in
    that the lenticular lens has multiple convex unit lenses disposed on the base film with their long sides parallel to each other,
    that the two edges of each unit lens on its section vertical to the longer direction are a pair of curves spreading outwardly from the upside of the cross section, situated on the side opposite to the base film, to the base of the cross section, situated on the base film side, and
    that a space between each two adjacent unit lenses is filled with a resin having a refractive index lower than that of the unit lenses,
    wherein the angle $\theta$ between a tangent to the curves of each unit lens and a line parallel to the upside and base of the unit lens is acute, and the angle $\theta$ with any line parallel to the upside and base of the unit lens is in a range represented by the following inequality:

$$139(d/p)^3 - 176(d/p)^2 + 78(d/p) + 74.4 > \theta > 346(d/p)^3 - 469(d/p)^2 + 219(d/p) + 45.0$$

where d is the length of half of the distance between the two curves, and p is the pitch at which the unit lenses are disposed.

* * * * *